(No Model.) 5 Sheets—Sheet 1.

J. CAUDERAY.
APPARATUS FOR MEASURING ELECTRICITY.

No. 366,202. Patented July 12, 1887.

Witnesses

Inventor (No Model.) 5 Sheets—Sheet 2.

J. CAUDERAY.
APPARATUS FOR MEASURING ELECTRICITY.

No. 366,202. Patented July 12, 1887.

(No Model.)

J. CAUDERAY.
APPARATUS FOR MEASURING ELECTRICITY.

No. 366,202. Patented July 12, 1887.

5 Sheets—Sheet 3.

(No Model.) 5 Sheets—Sheet 4.
J. CAUDERAY.
APPARATUS FOR MEASURING ELECTRICITY.
No. 366,202. Patented July 12, 1887.
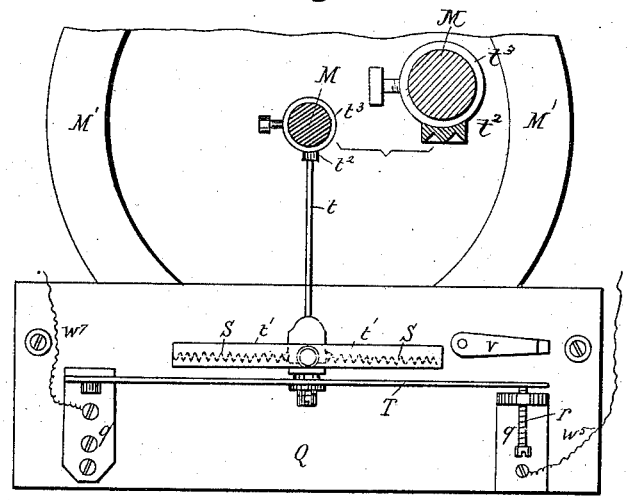
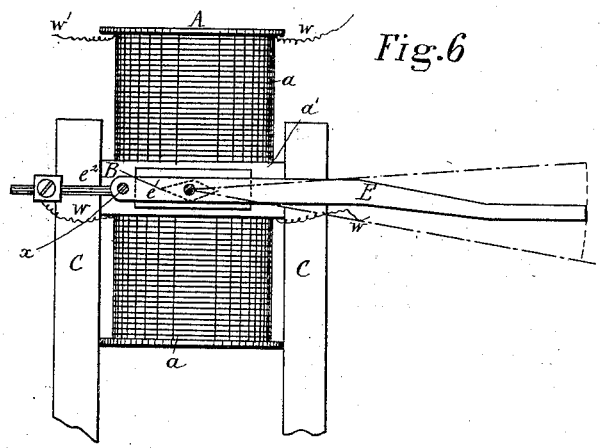
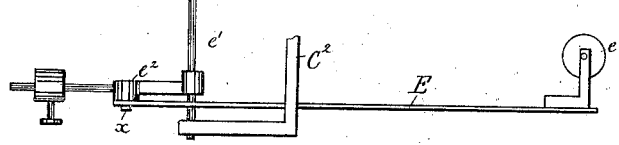
Witnesses  Inventor (No Model.)　　　　　　　　　　　　　　　　　　5 Sheets—Sheet 5.
J. CAUDERAY.
APPARATUS FOR MEASURING ELECTRICITY.
No. 366,202.　　　　　　　　Patented July 12, 1887.
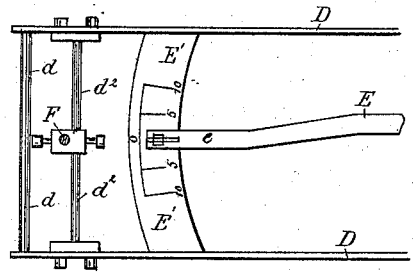
Fig. 5
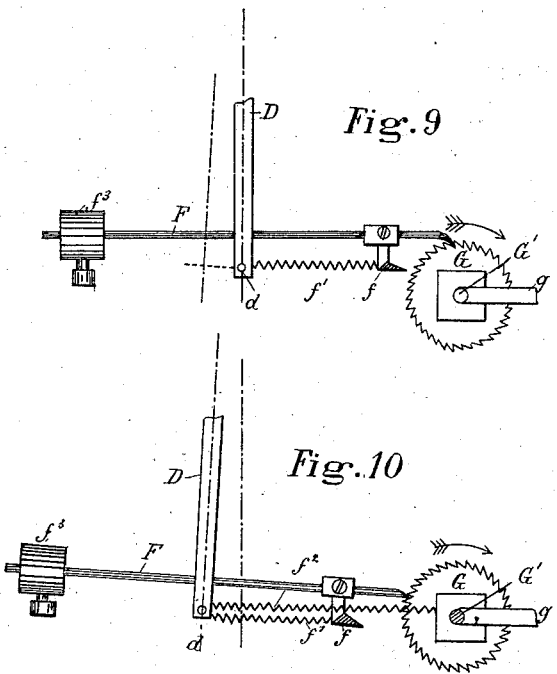
Fig. 9
Fig. 10
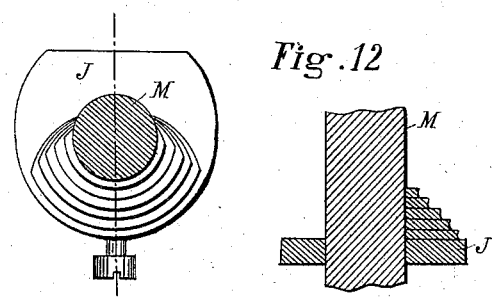
Fig. 12
Witnesses　　　　　　　　　　　　　　　　　Inventor

UNITED STATES PATENT OFFICE.

JULES CAUDERAY, OF PARIS, FRANCE.

APPARATUS FOR MEASURING ELECTRICITY.

SPECIFICATION forming part of Letters Patent No. 366,202, dated July 12, 1887.

Application filed July 3, 1886. Serial No. 207,106. (No model.) Patented in France November 2, 1885, No. 171,995.

*To all whom it may concern:*

Be it known that I, JULES CAUDERAY, a citizen of Switzerland, residing at Paris, in the Department of the Seine, France, have invented certain new and useful Improvements in Apparatus for Measuring Electricity; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to modifications introduced in the electric meter described in my United States Patents No. 310,252, of January 6, 1885, and No. 318,166, of May 19, 1885. It is the object of these modifications to simplify the construction of the meter and make it less expensive, so as to render it available for use in cases of small consumption. The meter is, in general, constructed on the same principle, except that the mode of actuating the ratchet-wheel which drives the registering mechanism is different, and the revolving toothed cylinder is omitted and replaced by a novel arrangement of cones formed in steps or series of cams or eccentrics of different radius, as hereinafter described.

The accompanying drawings represent the instrument as constructed according to these improvements.

Figure 1:
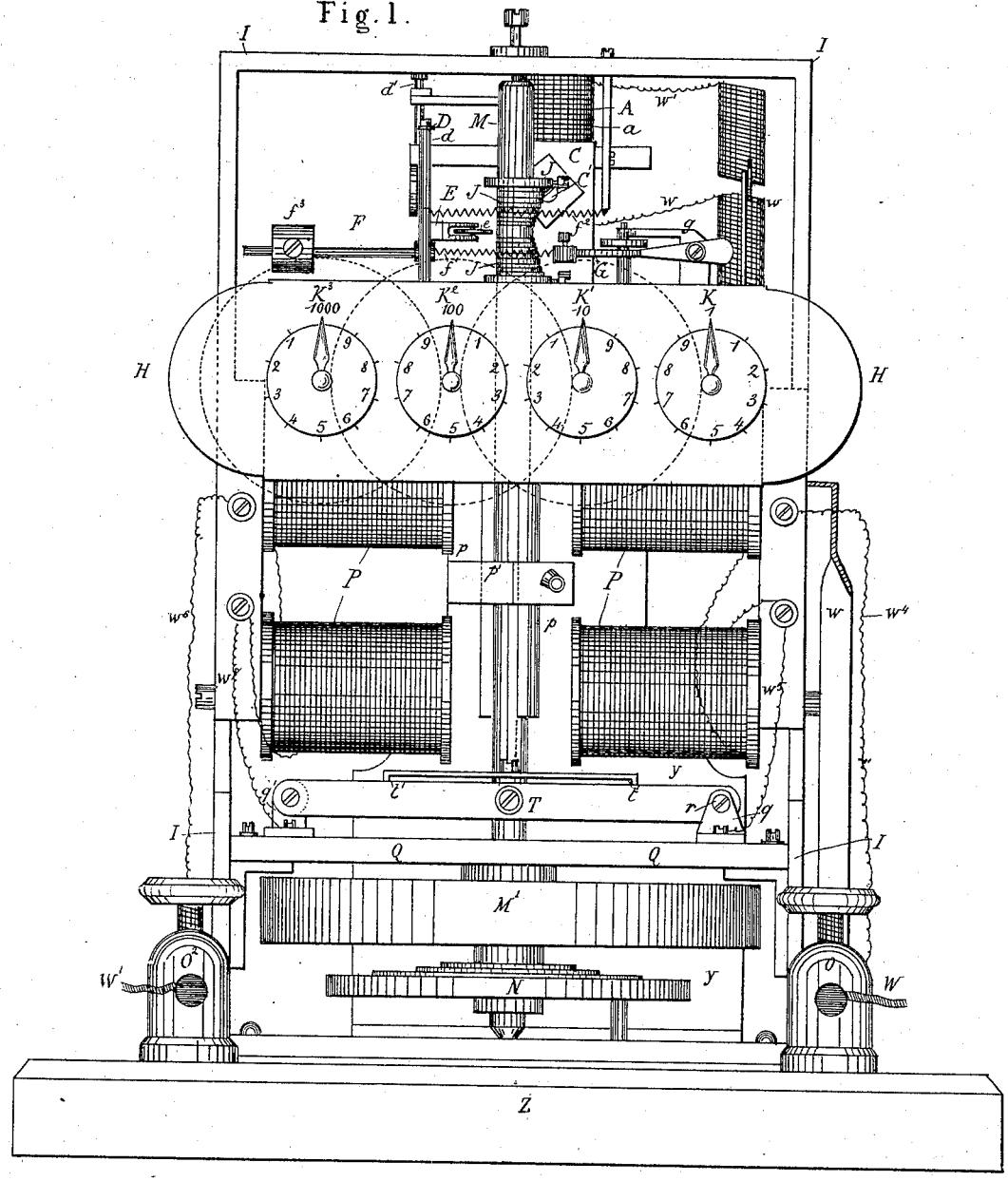
Figure 2:
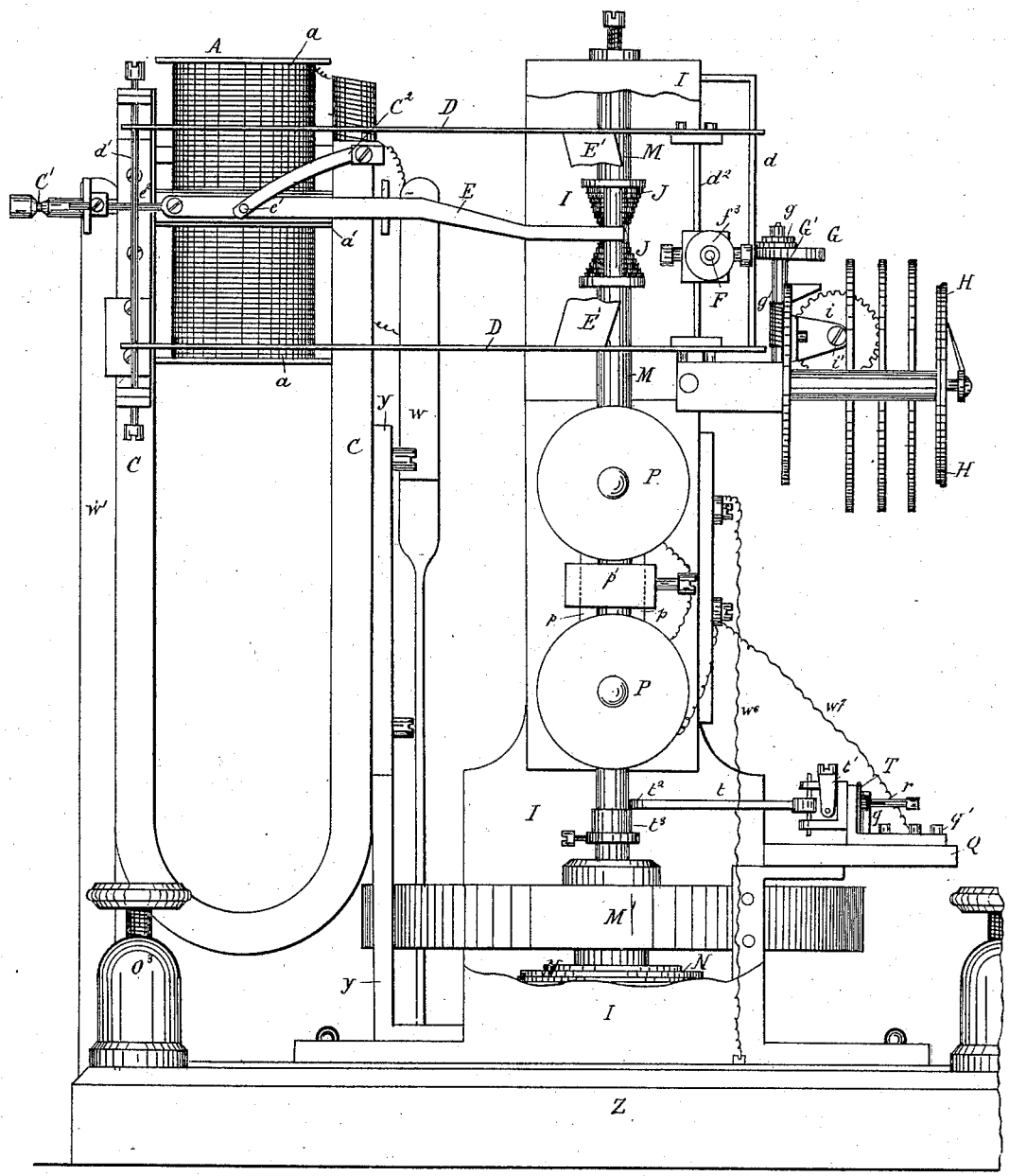
Figure 3:
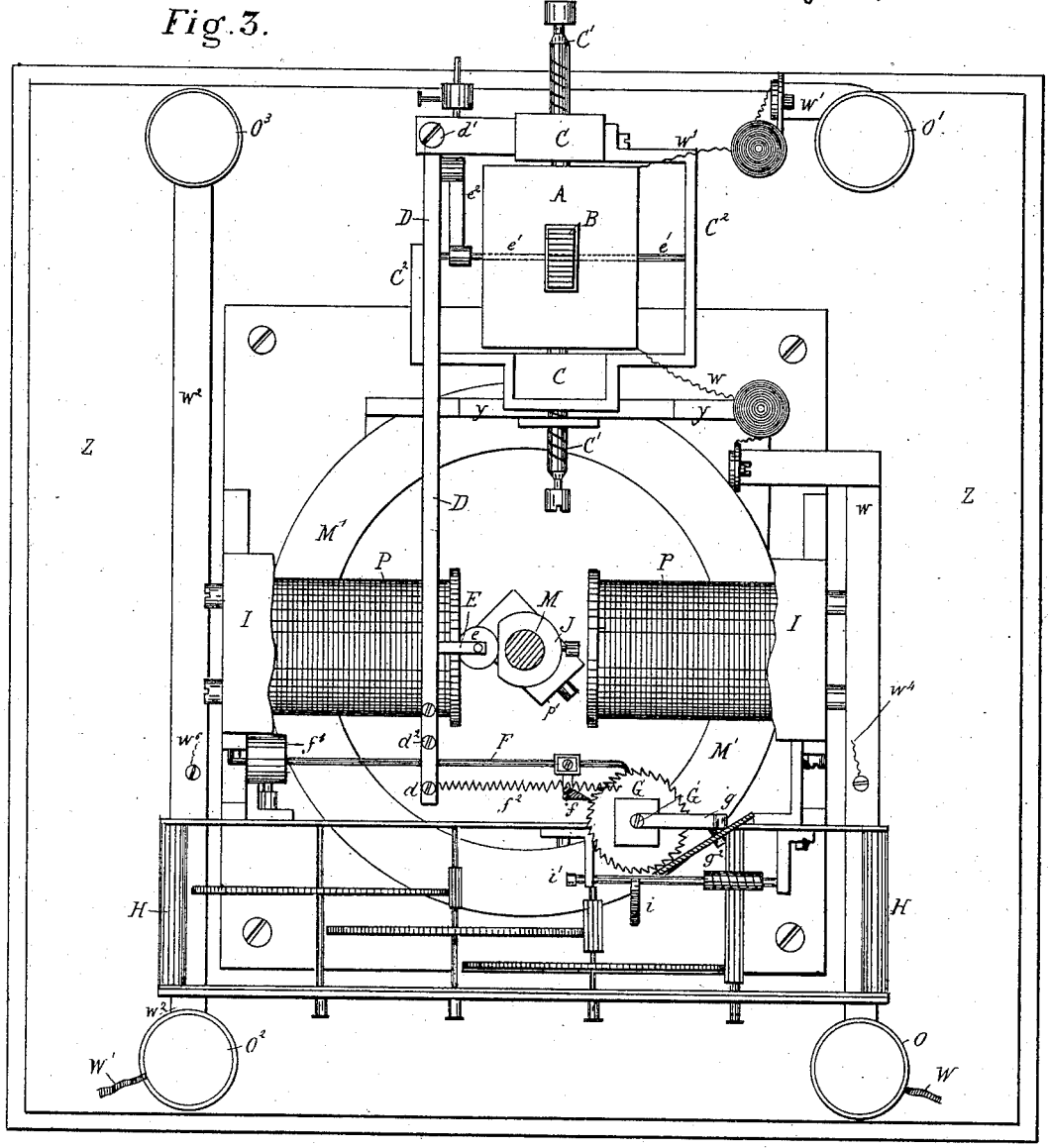
Figure 7:
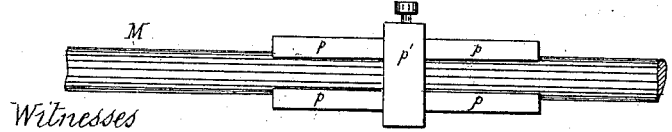
Figure 8:
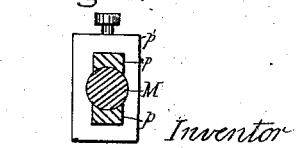

Figure 1 is a front elevation. Fig. 2 is a side elevation, the side casing being removed to show the inner parts of the machine. Fig. 3 is a plan view, the upper part of the frame being partly broken away. Fig. 4 is a plan view of the balance-disk and regulating devices, showing a portion enlarged. Figs. 5 to 12 are detached views of various parts.

A is a vertical galvanometer, between the coils $a\ a$ of which a frame, $a'$, is supported. As can be seen from Figs. 2, 3, and 6, an arbor, $e'$, passes through this frame and carries in its middle part a needle, B, permanently fixed to it. The galvanometer is placed between the tips of the two upright arms of a horseshoe-magnet, C, secured to a standard, Y. The arms of the magnet, as well as the end walls of the frame $a'$, are pierced on each side by a horizontal iron screw, $C'\ C'$. These screws form adjustable pole-pieces for the magnet, as they enable the poles of the magnet to be brought as near to the ends of the needle B as may be desired. A hoop or flange, $C^2$, Fig. 3, secured to the two ends of the magnet and passing around the magnet and the frame $a'$, carries the bearings of the ends of the axle $e'$.

At one end of the arbor $e'$ an arm, $e^2$, is mounted on it, and to this arm is fixed, at $x$, Fig. 11, a flat rod, E, which oscillates about $e'$, together with the arm $e^2$, but at the same time possesses sufficient lateral flexibility to move in the way required, for a purpose to be explained hereinafter. The flat rod E, Figs. 2, 5, 6, 11, projects horizontally to the shaft M, against which it presses by means of a little bracket carrying a friction-roller, $e$. The arm $e^2$, to which the rod E is fixed, has its projecting end threaded to receive a movable counterpoise. The rod E, following the movement of the arbor $e'$ produced by the action of the needle B, oscillates in a vertical plane, and accordingly its roller $e$ glides along the shaft M. The counterpoise serves to increase its sensibility and to bring it back to the zero of the scale. The roller of the rod E performs its oscillations in front of a graduated scale cut on a vertical plate, E', which is shown in Fig. 5, and also in Fig. 2, where part of it is broken away. This scale serves to estimate the amplitude of the oscillations. Its graduations correspond to the variations of the eccentrics or the steps of the cones, to be mentioned hereinafter. When the instrument is at rest, the roller $e$ should coincide with the zero of the scale without touching the shaft M. The function of the rod E and the effect of its oscillations upon the shaft M will be explained later on.

The shaft M, which passes vertically through the whole machine, rests at the bottom in a step-bearing fixed in the foot-plate of the machine, and is at the top kept in place by means of an adjusting-screw which passes through the top plate of the frame. This shaft M carries the horizontal fly-wheel M' and the impelling-spring N. These parts (the shaft, fly, and spring) represent on a larger scale the balance-staff, balance-disk, and spring of a watch. Their to-and-fro movement should be so regulated by means of the spring as to be performed in one second. There, as in my former patent, the motive power is derived from the action of the electro-magnets. These electro-magnets are supported by the frame-plates I. They act on the armatures $p\ p$, which are secured to the shaft M by means of the ring and screw $p'$, Figs. 7 and 8. These armatures are arranged normally in a plane oblique to the poles of the magnets; but when the magnets are in action the attraction of the cores will bring the armatures into the axial plane of the magnets. The circuit acting on the magnets is derived from the main circuit, or the one to be measured. The connections between these circuits are established in the following manner: The binding-posts O O' on the bottom plate of the machine are respectively connected with the opposite terminals of the galvanometer coils by means of large wires $w\ w'$, directly connected to the poles of these coils in the usual manner. The binding-posts $O^2\ O^3$ are connected to each other by means of a large wire, $w^2$. The wires of the main circuit W W' are to be connected to the binding-posts O $O^2$. One of the magnets P has one pole of its coils connected by means of a wire, $w^4$, to the large wire $w$, and the other pole by means of a wire, $w^5$, to a metallic bracket, $q$, mounted on a non conducting platform, Q, and provided with an adjustable contact-screw, $r$. The other magnet connects from one terminal, by means of a wire, $w^6$, with the large wire $w^2$, connecting the binding-posts $O^2\ O^3$, and from the other terminal, by means of a wire, $w^7$, with a bracket, $q'$, mounted on the non-conducting platform Q. A flat horizontal spring, T, is secured with one of its ends to the bracket $q'$, while its other end lies in front of the contact-screw $r$, Figs. 1 and 4. On the rear side of the flat spring T there is a bracket, $t'$, in which is pivoted one end of a light metallic rod, $t$, the other end projecting very nearly to the shaft M. When this shaft is in its normal position, the inner end of the rod $t$ will engage with one of the notches of a double-notched lug, $t^2$, carried by a collar, $t^3$, which is fixed upon the shaft M. This lug projects sufficiently from the shaft to push the rod $t$ back, and the rod in turn pushes the free end of the spring T against the tip of the contact-screw $r$, which it does not touch as long as the rod is out of engagement with the lug. The rod $t$ points in its normal position to the shaft M, and is kept in this position by means of two springs, $s\ s$, Fig. 4, which, though allowing it to yield laterally in both directions, always bring it back to its normal position.

The spring T is provided with a platinum face where it comes in contact with the screw $r$. This spring, when in contact with the screw $r$, closes the derived circuit in which the magnets P P are included. This derived circuit is closed in two cases—viz, first, when the machine is at rest, and, secondly, when, the machine being in operation, the amplitude of oscillation of the balance-disk becomes too small owing to the loss of momentum. In this latter case a time will come when the lug $t^2$ will not brush past the end of the rod $t$, as it does as long as the disk makes full oscillations, and then the end of this rod will be caught in one of the notches of the lug. The rod is therefore pressed endwise and pushes the free end of the spring T against the contact-screw $r$, thus closing the derived circuit. The contact continues but a short time—say for about one-fourth of an oscillation; but while it continues the electro-magnets are charged and attract their armatures $p\ p$, thus imparting to the shaft and balance-disk a fresh impulse sufficient to enable them to make full oscillations for from seven to twelve seconds, when a renewed impulse is again given, as before. The balance, being at rest, will be set in motion as soon as an electric current passes on the main circuit, as the derived circuit will then be closed and will receive its due proportion of the current.

Two cones or series of cams or eccentrics of uniformly-increasing radius are keyed to the shaft M. These cones or eccentrics J J are cut so as to form steps of a particular form, as shown in the drawings. They are movable and independent of each other. As will be seen, each of these cones is adjustable on the shaft and fixed to it by means of a binding-screw. The space between them corresponds to the zero of the scale E'. The steps of these cones increase in radius by one millimeter from step to step, and the height of the steps is also one millimeter. When the machine is at rest, the roller $e$, supported by the bracket of the flat rod E, will stand opposite the intermediate space between the two cones or series of cams at a distance of about two millimeters from the shaft M; but as soon as the needle B, actuated by the current, causes its arbor $e'$ to revolve, the rod E begins to oscillate in a vertical direction, and its roller $e$, in ascending or descending along the shaft M, will brush one of the steps of the truncated cones or series of cams or eccentrics J, arranged symmetrically on the shaft. One of these cones or series of cams is shown in Fig. 12 in twice its actual size. It is to be noticed that these steps have an eccentric cross-section, the swelling or projecting part being on that side of the shaft M which during the oscillations comes in contact with the roller. This swelling gradually diminishes and terminates flush with the shaft, so that the roller can continuously glide along one of these steps and return to the space between the cones or series of cams, where it is not acted upon. The effect produced by these steps is to remove the roller more or less from the shaft M. During this to-and-fro movement of the rod E the elbow of the bracket which carries the roller abuts against the scale-plate E' and pushes it back at every course. This plate E', on which the scale is cut to show the amplitude of the oscillating movement of the rod E, is secured in a vertical position (see Fig. 5) to two horizontal bars, D D, forming an open frame, the rear post of which, $d'$, is pivoted on two screws passing through the flanges of a copper plate secured to the rear arm of the magnet C. (See Fig. 2.) The open frame D D is constantly brought back to its normal position by means of a spiral spring attached to the main frame I. (See Fig. 1.)

The intermediate vertical post, $d^2$, of the open frame D D carries a little block, which is pierced by a horizontal rod, F, Figs. 5, 9, 10, which can be adjusted in its position as desired. The end of this rod is flattened to form a pawl engaging with the horizontal ratchet-wheel G, which has its teeth at a distance of one millimeter from one another. The rod F carries a support, to which is fixed a dog, $f$, which also engages with the teeth of the wheel, so as to restrict its forward movement along the rod F. A spring, $f'$, attached at one end to the dog $f$ and at the other end to the post $d$ at the rear end of the open frame D, constantly acts upon the rod F, so as to keep its pawl before the teeth of the ratchet-wheel. An adjustable counterpoise, $f^3$, at the opposite end of the rod F serves to regulate its motion and to keep it in equilibrium in case the mechanism should be out of gear. A strip-spring, $g^2$, secured to the arm $g$, prevents the ratchet-wheel from moving backward. The greater the deviation of the open frame D produced by the lateral movement of the rod E the greater will be the number of teeth of the ratchet-wheel which the pawl of the rod F will let pass, owing to the action of the spring $f'$. This is illustrated by Figs. 9 and 10, which exhibit the extreme positions of these parts—viz., Fig. 9 the position of rest, and Fig. 10 the position in which the pawl turns six teeth. This latter position corresponds to the step of the cone or the cam of greatest diameter. Indeed, the distance between two successive teeth of the ratchet-wheel is exactly equal to the height and width of the cams or steps of the cones. Hence, if the rod E has its roller in contact with the first cam or step of one of the cones, the pawl of the rod F will take one tooth of the ratchet-wheel; if the roller is on the sixth step or cam, the pawl of the rod F will take six teeth, Fig. 10, and so on. In these two cases, then, the ratchet-wheel will be moved forward by the impulsion of the pawl by one or six teeth, according to the action produced by the current upon the needle B.

The ratchet-wheel is mounted on a vertical shaft, G', which revolves in the arm $g$ and rests with its foot in a socket secured to the rear plate of the registering mechanism H. The shaft G' is provided with a worm, $g'$, which engages with a toothed wheel, $i$, Fig. 2. This wheel forms part of the gear of the registering mechanism, which is constructed in the usual way, and need not here be described.

It results from the above description that the needle B, being acted upon by the intensity of the current to be measured, in turn acts upon the rod E, which, moving up or down, carries its roller $e$ into the plane of rotation of one or another of the steps of the cones J J. Thence the effect is transmitted to the open frame D D, and by it to the rod F, and thus determines the greater or less number of teeth of the ratchet-wheel moved, and hence the rotation of the gearing of the register.

It will be understood that the relative position and adjustment of the parts must be determined according to the effect to be produced, and that the details of execution may vary without interfering with the principle underlying the machine.

With this reservation, I claim as my invention—

1. The herein-described electric meter, consisting of galvanometer-coils $a\ a$, permanent magnet C, needle B, arbor $e'$, provided with arm $e^2$, rod E, secured to arm $e^2$ and provided with a roller, shaft M, provided with cams or eccentrics J, a register, and a pawl actuated by the arm E and serving to work the register.

2. In an electric meter, the combination of galvanometer coils and needle, an arm carried by the needle-arbor and provided with a roller, an oscillating shaft provided with cams or eccentrics, a register, and a pawl actuated by the arm secured to the needle-arbor and serving to give motion to the register-train.

3. In combination with coils $a$ and needle B, arbor $e'$, carrying said needle, and also carrying an arm, E, capable of being deflected laterally, a swinging frame, D, in rear of the arm E, provided with a pawl, ratchet-wheel G, connected with and serving to give motion to the register, shaft M, provided with cams or eccentrics J, having a series of steps, and means, substantially such as described, for imparting oscillatory motion to said shaft.

4. In an electric meter, the combination of a galvanometer-needle, B, an arbor, $e'$, rigidly secured to said needle and pivoted at its ends in a supporting-frame, a rod, E, carried by said arbor, a shaft, M, provided with armatures $p\ p$, electro-magnets P, balance-wheel M', spring N, and circuit-closing device consisting of notched lug $t^2$, yielding arm $t$, spring-bar T, and contact-screw $r$.

5. In an electric-current meter, the combination of a galvanometer, an arm secured upon the needle-arbor and movable with the needle, said arm being susceptible of flexure at right angles to the direction of its oscillation, a register, a swinging frame provided with a pawl or dog for actuating the register and arranged in rear of the flexible arm, a shaft arranged to oscillate in a prescribed period of time, and cams or eccentrics carried by said shaft, and serving to give motion to the flexible arm at right angles to the direction of its oscillation, whereby it is caused to move the pawl or dog carrying frame, and thus to actuate the register.

6. In an electric meter, the combination of galvanometer coils and needle, an arm carried by the needle-arbor, an oscillating shaft provided with cams or eccentrics for giving motion to the arm, a register, a pawl actuated by the arm secured to the needle-arbor and serving to give motion to the register-train, and a permanent magnet having its poles arranged in proximity to the ends of the needle.

7. In an electric-current meter substantially such as described, the combination, with the galvanometer, register, and motor, of a circuit-closer consisting of spring-bar T, arm $t$, pivotally attached thereto, and notched hub $t^2$.

8. In an electric-current meter, the combination of a galvanometer, a register, a motor, and a circuit-closer, all constructed substantially as described, and a permanent magnet having its poles arranged in close proximity to the poles of the needle, substantially as described.

9. In combination with galvanometer-coils $a$ and needle B, arm E, frame D, provided with cross rod $d^2$ and dog F, and register H, having its ratchet-wheel G arranged in the path of dog F.

In testimony whereof I affix my signature in presence of two witnesses.

JULES CAUDERAY.

Witnesses:
G. DE MESTRAL,
ROBT. M. HOOPER.